US012775615B2

(12) United States Patent
Popescu et al.

(10) Patent No.: US 12,775,615 B2
(45) Date of Patent: Oct. 27, 2026

(54) USE OF COMPACT STRUCTURED QUERY LANGUAGE TO PROCESS A TEXT COMMAND BY AN ARTIFICIAL INTELLIGENCE MODEL

(71) Applicant: INTERNATIONAL BUSINESS MACHINES CORPORATION, Armonk, NY (US)

(72) Inventors: Octavian Popescu, Westchester, NY (US); Hangu Yeo, Westchester, NY (US); Irene Lizeth Manotas Gutiérrez, White Plains, NY (US); Vadim Sheinin, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 19/008,935

(22) Filed: Jan. 3, 2025

(65) Prior Publication Data

US 2026/0195325 A1 Jul. 9, 2026

(51) Int. Cl.
*G06F 16/2452* (2019.01)
*G06F 16/242* (2019.01)
*G06F 16/2455* (2019.01)

(52) U.S. Cl.
CPC .... *G06F 16/24522* (2019.01); *G06F 16/2433* (2019.01); *G06F 16/2456* (2019.01)

(58) Field of Classification Search
CPC ........... G06F 16/24522; G06F 16/2433; G06F 16/2456

(Continued)

(56) References Cited

U.S. PATENT DOCUMENTS 6,615,172 B1 9/2003 Bennett et al.
7,136,850 B2 11/2006 Keller et al.
(Continued)

FOREIGN PATENT DOCUMENTS

CN 108022039 A 5/2018
CN 108665429 A 10/2018
(Continued)

OTHER PUBLICATIONS

Li et al., "An Efficient Transformer Decoder with Compressed Sub-layers", arXiv:2101.00542, Jul. 2021, (9 pages).
(Continued)

*Primary Examiner* — Cam Y T Truong
(74) *Attorney, Agent, or Firm* — Harrity & Harrity, LLP

(57) ABSTRACT

A method and computer program product for training, testing and using an artificial intelligence (AI) model. Full Structured Query Language (SQL) commands are converted into compact SQL commands which, along with text commands, are received by the AI model as training data. The AI model is trained by minimizing a loss function with respect to a comparison between each full SQL command generated by the AI model and a respective full SQL command in the training data, resulting in outputted compact SQL commands which are converted into respective one or more full SQL commands that are executed on a database from which the AI model is tested and improved by adjusting parameters of the AI model. The trained AI model is used to convert a text command into a compact SQL command which is converted into a full SQL command which is executed to retrieve data from a database.

20 Claims, 9 Drawing Sheets

(58) Field of Classification Search
USPC .......................................................... 707/713
See application file for complete search history.

(56) References Cited

U.S. PATENT DOCUMENTS

| | | | |
|---|---|---|---|
| 10,714,058 B2 | 7/2020 | Diederich et al. | |
| 11,561,946 B1 | 1/2023 | Jiang et al. | |
| 11,734,269 B2 | 8/2023 | Erdmann et al. | |
| 11,734,510 B2 | 8/2023 | Hu et al. | |
| 11,789,945 B2 | 10/2023 | Lee | |
| 2003/0088548 A1* | 5/2003 | Kumar | G06F 16/24534 |
| 2007/0239669 A1 | 10/2007 | Ordonez et al. | |
| 2009/0055370 A1* | 2/2009 | Dagum | G06F 16/182 |
| 2012/0016901 A1 | 1/2012 | Agarwal et al. | |
| 2013/0283398 A1* | 10/2013 | Wu | G06F 21/60 726/28 |
| 2014/0095469 A1 | 4/2014 | Chen et al. | |
| 2015/0039642 A1* | 2/2015 | Chang | G06F 16/8358 707/760 |
| 2017/0322974 A1 | 11/2017 | Hoffmann | |
| 2017/0351511 A1 | 12/2017 | Bar-Or et al. | |
| 2018/0157978 A1 | 6/2018 | Buda et al. | |
| 2019/0272296 A1 | 9/2019 | Prakash et al. | |
| 2020/0257679 A1 | 8/2020 | Sheinin et al. | |
| 2020/0272667 A1* | 8/2020 | Ding | G06N 20/00 |
| 2021/0056108 A1 | 2/2021 | Shmueli et al. | |
| 2021/0209501 A1 | 7/2021 | Sarferaz | |
| 2021/0224281 A1 | 7/2021 | Lee et al. | |
| 2021/0357402 A1 | 11/2021 | Cheng et al. | |
| 2021/0390099 A1 | 12/2021 | Rahmfeld et al. | |
| 2022/0027719 A1 | 1/2022 | Wagner et al. | |
| 2022/0129450 A1 | 4/2022 | Cao et al. | |
| 2022/0284023 A1 | 9/2022 | Li et al. | |
| 2022/0358125 A1 | 11/2022 | Scholak et al. | |
| 2023/0186161 A1 | 6/2023 | Arthur et al. | |
| 2023/0252024 A1 | 8/2023 | Qin et al. | |
| 2023/0274095 A1 | 8/2023 | Kelkar et al. | |
| 2023/0306022 A1 | 9/2023 | Popescu et al. | |
| 2024/0320222 A1* | 9/2024 | Sheinin | G06F 16/2433 |
| 2025/0259075 A1* | 8/2025 | Crabtree | G06F 16/3344 |

FOREIGN PATENT DOCUMENTS

| | | |
|---|---|---|
| CN | 112287093 A | 1/2021 |
| CN | 112348176 A | 2/2021 |
| CN | 113377808 A | 9/2021 |
| CN | 114218127 A | 3/2022 |
| CN | 114462571 A | 5/2022 |
| CN | 116186079 B | 7/2023 |
| CN | 116627786 A | 8/2023 |

OTHER PUBLICATIONS

Nawrot et al., “Efficient Transformers with Dynamic Token Pooling”, arXiv:2211.09761, Nov. 2022, (13 pages).

United States Final Rejection dated Sep. 25, 2024, 11 pages, in U.S. Appl. No. 18/188,970.

United States Non-Final Rejection dated Mar. 27, 2024, 14 pages, in U.S. Appl. No. 18/188,970.

United States Notice of Allowance dated Dec. 24, 2024, 11 pages, in U.S. Appl. No. 18/188,970.

Yale University, “Spider 1.0 Yale Semantic Parsing and Text-to-SQL Challenge”, https://yale-lily.github.io/spider, referenced on Mar. 23, 2023 (12 pages).

* cited by examiner

USE OF COMPACT STRUCTURED QUERY LANGUAGE TO PROCESS A TEXT COMMAND BY AN ARTIFICIAL INTELLIGENCE MODEL

BACKGROUND

The present invention relates to translation of a text to Structured Query Language (SQL), and more specifically, to translation of text to SQL using compact SQL.

SUMMARY

Embodiments of the present invention provide a method and a computer program product for training, testing, and using an artificial intelligence (AI) model in conjunction with compact Structured Query Language (SQL).

One or more processors receive text commands and respective full SQL commands. The one or more processors convert the full SQL commands into respective compact SQL commands. Using the one or more processors, the AI model receives training data comprising the text commands and the compact SQL commands. The one or more processors train the AI model by minimizing a loss function, using backpropagation, with respect to a comparison between each full SQL command generated by the AI model and a respective full SQL command in the training data, resulting in outputted compact SQL commands, wherein each full SQL command generated by the AI model is a command to retrieve data from a database.

The trained AI model receives a text command, said trained AI model having been trained to convert text commands into compact SQL commands. The text command is converted by the trained AI model into a compact SQL command. Using a database schema, the one or more processors convert the compact SQL command into a full SQL command. The one or more processors execute the full SQL command to retrieve data from a database.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
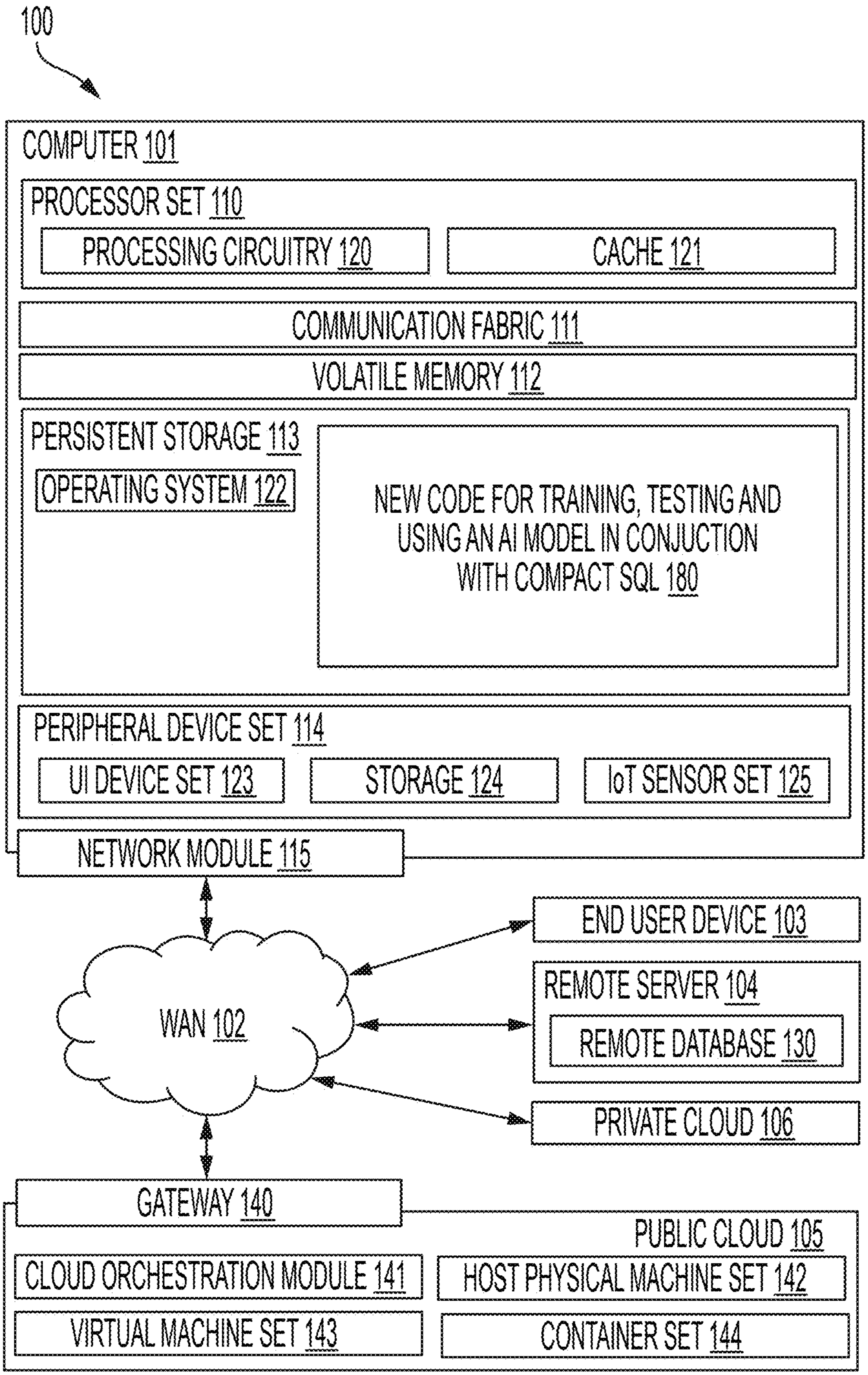
FIG. 1 depicts a computing environment which contains an example of an environment for the execution of at least some of the computer code involved in performing the inventive methods, in accordance with embodiments of the present invention.

FIG. 1 depicts a computing environment 100 which contains an example of an environment for the execution of at least some of the computer code involved in performing the inventive methods, in accordance with embodiments of the present invention. Such computer code includes new code for training, testing, and using an artificial intelligence (AI) model in conjunction with compact Structured Query Language (SQL) 180. In addition to block 180, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 180, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 180 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 180 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICRO-SERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

Structured Query Language (SQL) is a language for storing, manipulating, and retrieving data in databases (e.g., relational databases). A full SQL command for use in embodiments of the present invention is defined as a SQL command used in practice for retrieving data from a database, which is a Select command in SQL. A full SQL command for use in embodiments of the present invention does not encompass SQL commands for storing data (e.g., Insert) or for manipulating data (e.g., Update).

A compact SQL command is defined as a command for retrieving data from a database that may be derived from a full SQL command by deleting information from the full SQL command in accordance with rules provided in embodiments of the present invention as discussed infra. For example, the compact SQL command "select T2 T1.x where T1.age>25" may be derived from the full SQL command "select T1.* from T1 join T2 where T1.age>25".

Although a compact SQL command is not executable, the compact SQL command may be converted to a full SQL command that is executable, using database schema.

Database schema is defined as data defining a logical structure of a database. The database schema define how data in the database is organized and how relationships between tables are maintained. The database schema may include, inter alia: (i) description of tables, each table having rows (records) and columns (fields); (ii) attributes such as size of data items in each table; (iii) columns in a table, defining the data type and constraints; (iii) primary keys, which are unique identifiers for rows in a table; (iv) foreign keys, which are attributes in one table that establish a relationship with another table; (v) logical connections between tables (e.g., one-to-many, many-to many, etc.); (vi) paths between tables.

The structure of a compact SQL command is limited to a structural form that enables the compact SQL command to be converted to a unique full SQL command having no ambiguities, even if ambiguities exist in the compact SQL command, by requiring that all missing and ambiguous information in the compact SQL command be uniquely recoverable from use of the database schema.

A text command to retrieve data from a database is expressed in ordinary English as would be expressed by a user (e.g., "which employees work in building A?").

A user may query a database with a text command to retrieve data from a database, where an artificial intelligence (AI) model (e.g., a deep learning model) may be used to convert the text command to a full SQL command to retrieve the data (via a SQL Select command) from the database. Then, the full SQL command may be executed to retrieve the data from the database. The AI model was previously trained to convert text commands for retrieving data from a database to respective full SQL commands for retrieving the data from the database.

Figure 2:
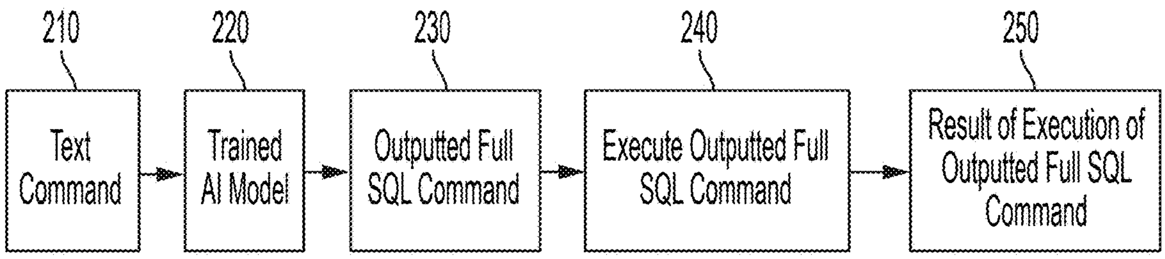
FIG. 2 depicts a method by which a text command to retrieve data from a database may be performed using a trained artificial intelligence (AI) model, in accordance with embodiments of the present invention.

FIG. 2 depicts a method by which a text command 210 to retrieve data from a database may be performed using a trained artificial intelligence (AI) model 220, in accordance with embodiments of the present invention. In one embodiment, the text command 210 is received from a user.

In FIG. 2, the text command 210 for retrieving data from the database is inputted to the trained AI model 220 which outputs a full SQL command 230 corresponding to the text command 210, followed by execution 240 of the full SQL command 230, followed by a result 250 having resulted from the execution 240 of the SQL command 230. The result 250 is a retrieval of data from the database in accordance with the full SQL command 230.

Figure 3:
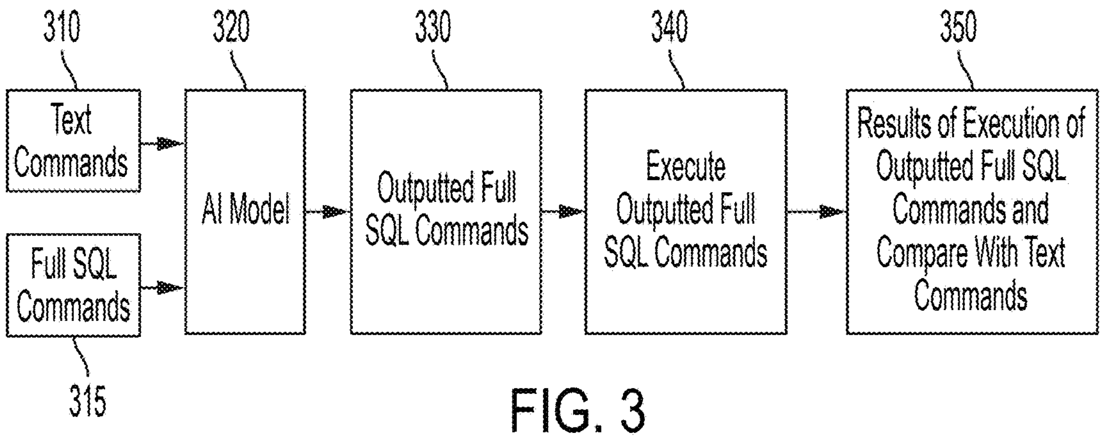
FIG. 3 depicts a process by which an AI model is trained to convert text commands into full Structured Query Language (SQL) commands, in accordance with embodiments of the present invention.

FIG. 3 depicts a process by which an AI model 320 is trained to convert text commands 310 into full SQL commands 330, in accordance with embodiments of the present invention.

The training data inputted to the AI model 320 for training the AI model 320 comprises the text commands 310 and the full SQL commands 315 respectively corresponding to the text commands 310. Each one of the text commands 310 has been converted to the respective one of the full SQL commands 315.

The training process optimizes parameters of the AI model 320 by minimizing a loss function, using backpropagation, with respect to a comparison between each of the full SQL commands generated by the AI model 320 and the respective full SQL commands 315 in the training data, resulting in the outputted full SQL commands 330. After being trained, the AI model 320 becomes the trained AI model 220 of FIG. 2.

The accuracy of the trained AI model 320 may be evaluated by executing 340 each of the outputted full SQL command 330 on the database and determining whether each result 350 of executing the outputted full SQL command 330 is a result of performing the respective text commands 310. The results 350 are retrieval of data from the database in accordance with each respective full SQL command 330.

If an unacceptable percentage of the results 350 do not correctly perform the respective text commands 310, then an attempt may be made to improve the AI model 320 (e.g., by adjusting parameters of the AI model 320).

Unfortunately, the conversion of the text command to a full SQL command by the AI model is subject to errors. Such errors may include syntax errors and/or semantic errors. A syntax error in the full SQL command may prevent execution of the full SQL command. A semantic error in the full SQL command may allow execution of the full SQL command, but the full SQL command may perform a different operation on the database than was intended by the text command.

Embodiments of the present invention provide an improved method for converting a text command into a full SQL command, via use of an AI model, compact SQL, and database schema. The improved method is more accurate and computationally faster than is the method described in FIGS. 2 and 3.

Figure 4:
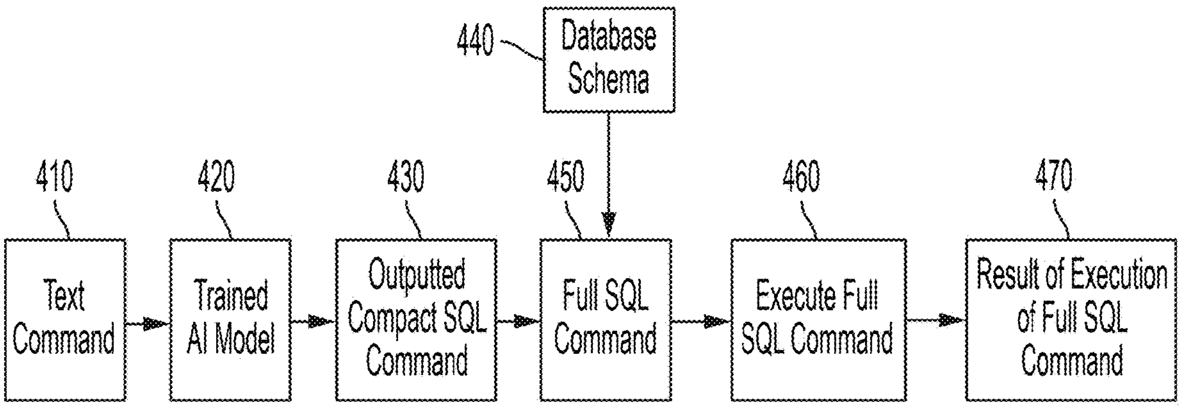
FIG. 4 depicts a method by which a text command on a database may be performed using: a trained artificial intelligence (AI) model, compact SQL, and database schema, in accordance with embodiments of the present invention

FIG. 4 depicts a method by which a text command 410 on a database may be performed using: a trained artificial intelligence (AI) model 420, compact SQL, and database schema, in accordance with embodiments of the present invention.

In FIG. 4, the text command 410 is inputted to a trained AI model 420 which outputs a compact SQL command 430 corresponding to the text command 410, followed by conversion of the compact SQL command 430 into a full SQL command 450 with assistance from database schema 440, followed by execution 460 of the full SQL command 450, followed by a result 470 having resulted from the execution 460 of the full SQL command 450. The result 470 is a retrieval of data from the database in accordance with the full SQL command 450.

Figure 5:
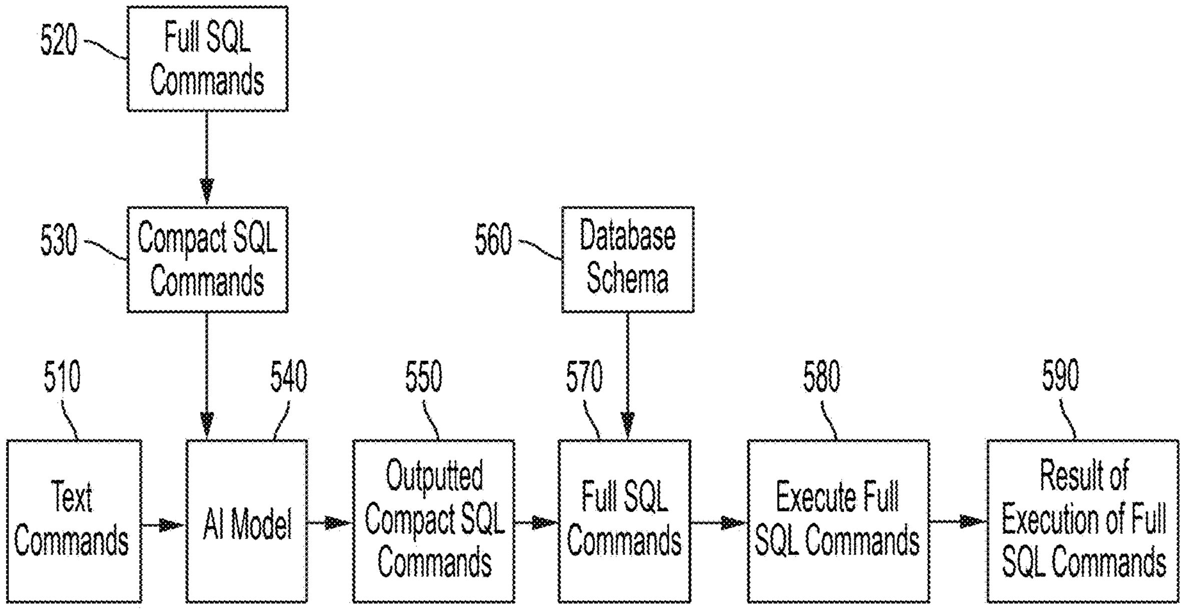
FIG. 5 depicts a process by which an AI model 540 is BEING trained to convert text commands into compact SQL command, in accordance with embodiments of the present invention.

FIG. 5 depicts a process by which an AI model 540 is BEING trained to convert text commands 510 into compact SQL command 550, in accordance with embodiments of the present invention.

The input to the process of FIG. 5 includes text commands 510, SQL full commands 520 respectively corresponding to the text commands 510, and database schema 560. Each one of the text commands 510 has been converted to the respective one of the full SQL commands 520.

The SQL commands 520 are converted to respective compact SQL commands 530.

The training data inputted to the AI model 540 for training the AI model 540 comprises datasets, wherein each dataset includes the text commands 510 and the compact SQL command 530 respectively corresponding to the text commands 510.

The training process optimizes parameters of the AI model 540 by minimizing a loss function, using backpropagation, with respect to a comparison between each of the compact SQL commands 550 generated by the AI model 540 and the respective compact SQL commands 530 in the training data, resulting in the outputted compact SQL commands 550. After being trained, the AI model 540 becomes the trained AI model 420 of FIG. 4.

The accuracy of the trained AI model 540 may be evaluated by; (i) converting the outputted compact SQL commands 550 produced by the AI model 540 into respective one or more full SQL commands 570 with assistance from database schema 560; (ii) executing 580 the one or more full SQL commands 570 on the database; (iii) determining a percent of the executions of the one or more full SQL commands on the database that do not correctly perform the respective text commands 510; and (v) in response to a determination that the percent of the executions of the one or more full SQL commands that do not correctly perform the respective text commands 510 exceed a specified incorrect execution threshold, the AI model 540 may be improved by adjusting parameters of the AI model 540.

The results 590 of execution of the one or more full SQL commands 570 are each a retrieval of data from the database in accordance with each respective full SQL command 570.

Embodiments of the present invention utilize the fact that a full SQL command contains both static data and dynamic components. The static components, which includes, inter alia, relationships between tables (e.g., joins and paths) does not change and may be found in the database schema. The dynamic data (e.g., where clauses) is specific to each full SQL command.

The conventional training approach described in FIG. 3 uses an AI model to convert a text command to a full SQL commands, which is both less accurate and less efficient than the inventive approach described in FIG. 5 which uses an AI model to convert a text command to a compact SQL command.

The improved efficiency of the inventive approach of FIG. 5 over the conventional approach of FIG. 3 is due to the fact that with the conventional approach described in FIG. 3, both the static and dynamic data aspects of the full SQL statement are being trained which is wasteful and inefficient, because the static data is known from the database schema and thus does not need to be involved in the training. In contrast, with the inventive approach described in FIG. 5, only the dynamic data aspects of the full SQL statement are being trained, which is simpler, more accurate, and more efficient than the conventional approach described in FIG. 3.

Ambiguities may arise in a compact SQL command that was created from a full SQL command. An ambiguity arises if two different full SQL commands, or two queries, lead to the same compact SQL command, or if a compact SQL command can be converted to two or more full SQL commands or to two or more queries. Thus, the process of transforming a full SQL to a compact SQL command may not be one to one.

Two cases for an ambiguity are: (i) restrictions expressed via a join operation and (ii) a self join operation.

A restriction expressed via a join operation occurs if a table used in a join operation is not mentioned in a select command or in a where clause. A restriction generates an ambiguity.

An example of an ambiguity due to a restriction expressed via a join operation is depicted in Table 1.

TABLE 1

| Row | Statement |
|---|---|
| 1 | How many dog owners are older than 25? |
| 2 | How many owners are older than 25? |
| 3 | select owner.name from owners join dogs on owner.id = dog.ownerId where owner.age > 25 |
| 4 | select owner.name where owner.age > 25 |

In Table 1, rows 1 and 2 are queries, row 3 is a full SQL command translated from the queries in rows 1 and 2, and row 4 is a compact SQL command converted from the full SQL command in row 3.

The compact SQL command in row 4 is ambiguous, because the compact SQL command in row 4 can be converted into either the query in row 1 or the query in row 2.

A self join operation is ambiguous if there is more than one self reference (e.g., a double join). A single join is not ambiguous.

An example of an ambiguity due to a self join operation is depicted in Table 2.

TABLE 2

| Row | Statement |
|---|---|
| 1 | How many airplanes leaving NY return to NY? |
| 2 | How many planes are located in NY? |

TABLE 2-continued

| Row | Statement |
|---|---|
| 3 | select count(T.id) from plane as T join plane as T1 on T.departure = T1.departure join plane as T2 on T.arrival = T2.arrival where T.airport = "NY" |
| 4 | select count(plane.id) where plane. airport = "NY" |

In Table 2, rows 1 and 2 are queries, row 3 is a full SQL command translated from the queries in rows 1 and 2, and row 4 is a compact SQL command converted from the full SQL command in row 3.

There are two self references, namely: the table T is joined with itself (using alias T1) on the Adeparture@ column and (ii) the table T is joined with itself (using alias T2) on the Aarrival@ column. It cannot be inferred from the compact SQL command in row 4 whether there is a single join or a double join. Thus, the double join generates an ambiguity.

A "path" is defined as a set of table links that connect two tables being connected in a join operation.

Although a compact SQL command lacks information existing in a full SQL command, the compact SQL command must include names of the tables and fields appearing in paths in the full SQL command.

Managing an ambiguity may involve onlyPath tables. An onlyPath table in a full SQL command is defined to be a table that is mentioned only in the path of a join operation and is not mentioned anywhere else in the full SQL command. For example, "dog" is an onlyPath table in the example of Table 1, because "dog" in mentioned in the path of a join operation and is not mentioned anywhere else in the full SQL command. There are no onlyPath tables in the self join example of Table 2, because the table "plane" is mentioned in the path of a join operation and is also mentioned outside of the join operation via "from plane".

Figure 6:
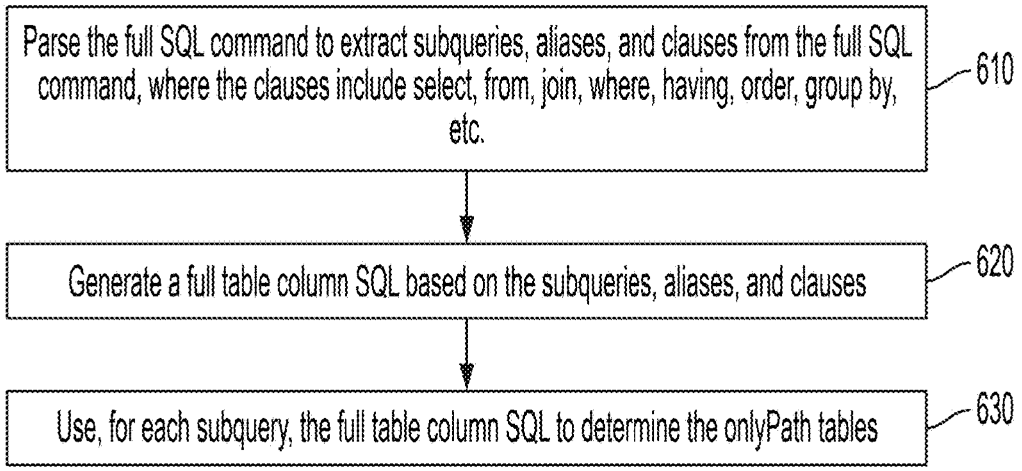
FIG. 6 is a flow chart describing a first process for determining onlyPath tables that exist in a full SQL command, in accordance with embodiments of the present invention.

FIG. 6 is a flow chart describing a first process for determining onlyPath tables that exist in a full SQL command, in accordance with embodiments of the present invention. The flow chart of FIG. 6 includes steps 610-630.

Step 610 parses the full SQL command to extract subqueries, aliases, and clauses from the full SQL command.

The scope of a subquery includes a query nested within another query such as a select statement nested within another select command. In the context of embodiments of the present invention, the scope of a subquery is defined to include a join nested within a select statement.

Step 620 generates a full table column SQL based on the subqueries, aliases, and clauses. The clauses include select, from, join, where, having, order, group by, etc.

The full table column SQL is defined to be a table or a graph that organizes the subqueries, aliases, and clauses into a format from which the relationships between and among the subqueries, paths between tables, aliases, and clauses may be inferred Step 630 uses, for each subquery, the full table column SQL to determine the onlyPath tables.

Figure 7:
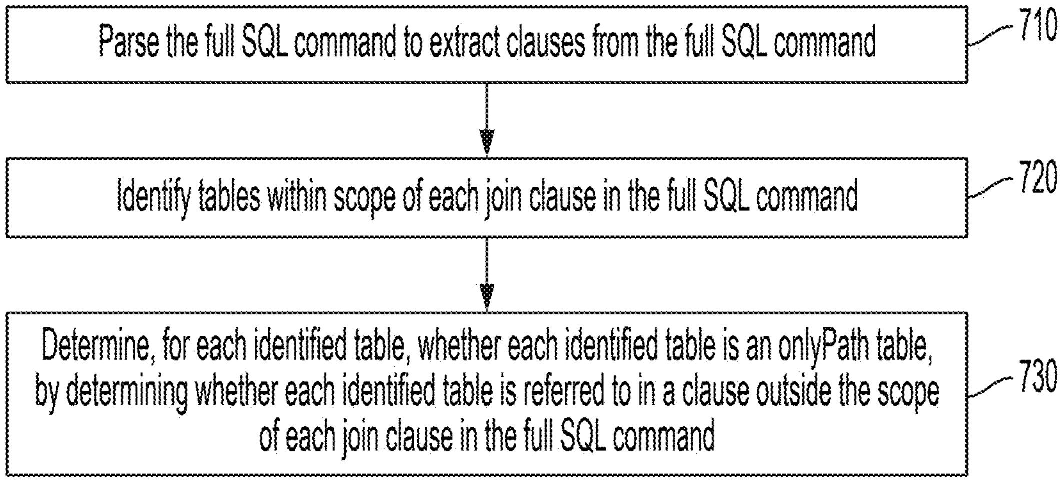
FIG. 7 is a flow chart describing a second process for determining onlyPath tables that exist in a full SQL command, in accordance with embodiments of the present invention.

FIG. 7 is a flow chart describing a second process for determining onlyPath tables that exist in a full SQL command, in accordance with embodiments of the present invention. The second process of FIG. 7 is more narrowly focused than the first process of FIG. 6.

The flow chart of FIG. 7 includes steps 710-730.

Step 710 parses the full SQL command to extract the clauses from the full SQL command. The clauses include select, from, join, where, having, order, group by, etc.

Step 720 identifies tables that are within the scope of each join clause.

Step 730 determines, for each identified table, whether each identified table is an onlyPath table, by determining whether or not each table is referred to in a clause outside the scope of each join clause, by determining whether each identified table is referred to in a clause outside the scope of each join clause in the full SQL command; i.e., if the identified table is, or is not, referred to in a clause outside the scope of the join clause, then the identified table is not, or is, respectively, an onlyPath table.

For example, applying the process of FIG. 7 to the SQL command in Table 1: (i) step 710 parses the full SQL command to extract a first clause of "select owner.name from owners", a second clause of "join dogs on owner.id=dog.ownerId", and a third clause of "where owner.age>25"; (ii) step 720 identifies table "dog" within the scope of the second clause which is a join clause; and step 730 determines, for the identified table "dog", that the identified table "dog" is an onlyPath table, by determining that the table "dog" is not referred to in the first and third clauses which are outside the scope of the join clause.

In one embodiment, a list of onlyPath tables is generated and onlyPath tables are added to this listin response to onlyPath tables being determined.

Figure 8:
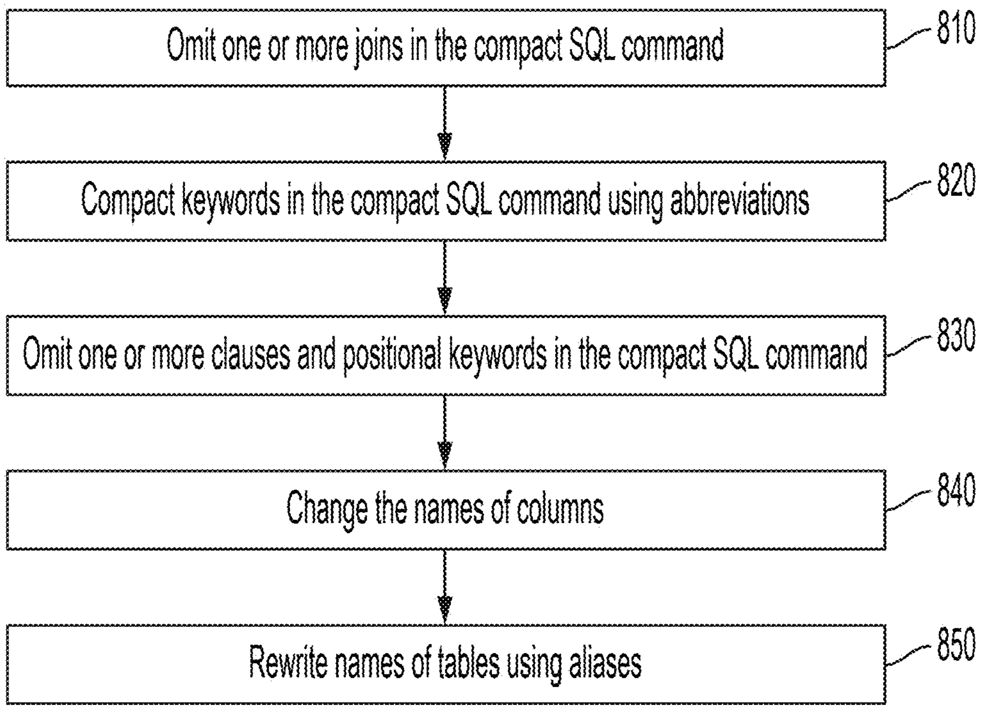
FIG. 8 is a flow chart describing a process for converting a full SQL command to a compact SQL command, in accordance with embodiments of the present invention.

FIG. 8 is a flow chart describing a process for converting a full SQL command to a compact SQL command, in accordance with embodiments of the present invention. The process of FIG. 8 includes steps 810-850. Some or all of steps 810-850 may be performed.

Step 810 omits one or more joins in the compact SQL command.

Step 820 compacts keywords in the compact SQL command using abbreviations. For example, abbreviate select as S, abbreviate count as C, abbreviate Distinct as D, abbreviate Having as H, abbreviate Limit as L, abbreviate Avg as A.

Step 830 omits one or more clauses and positional keywords (e.g., join, from, where, having, order by, =) in the compact SQL command.

For example, if the full SQL command is "select T1.* from T1 join T2 join T3 where T1.*=25 order by T1.*", then the compact SQL command is "S T1.*T1.*25 O T1.*"

Step 840 changes the names of columns.

Columns that have a unique name across the database can be used without including the table names.

Columns that have ambiguous names, which occur in more than one table, can be changed (e.g., by adding indexes 1, 2, . . . in data1, data2, . . . )

For example, if the full SQL command is "select T1.date from T1 join T2 where T2.date=01-01-2023", then the compact SQL command is "S D1 D201-01-2023". Note that "D" is an abbreviation of "Date"

Step 850 rewrites names of tables using aliases. The deep learning models transform the source language (English) into a label (SQL/compact SQL). The transformation is context conditioned using database schema and the names of tables are rewritten using acronyms which are specified in the context.

For example, if the full SQL command is "{employee: DOB, salary, position; manager: teamName, position}", then the compact SQL command is "{employee_E: employee_DOB_ED1, employee_salary:ES, . . . }".

For example, if the full SQL command is "{employee_E: employee_DOB_ED1, employee_salary:ES, . . . }", then the compact SQL command is "{employee_E: employee_DOB_ED1, employee_salary:ES, . . . }".

Figure 9:
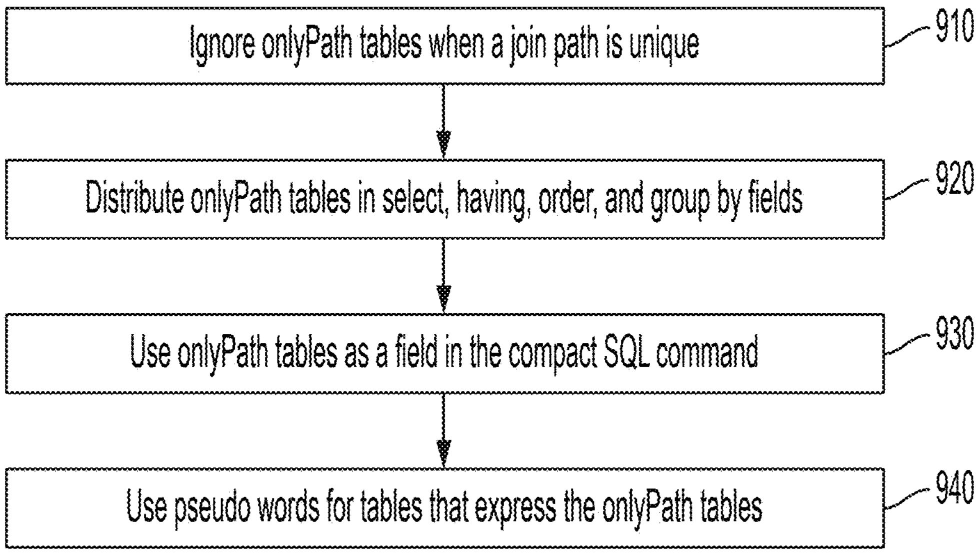
FIG. 9 describes a process of managing ambiguities in the compact SQL commands, in accordance with embodiments of the present invention.

FIG. 9 describes a process of managing ambiguities in the compact SQL commands, in accordance with embodiments of the present invention. The process of FIG. 9 includes steps 910-940. Some or all of steps 910-940 may be performed.

Figure 10:
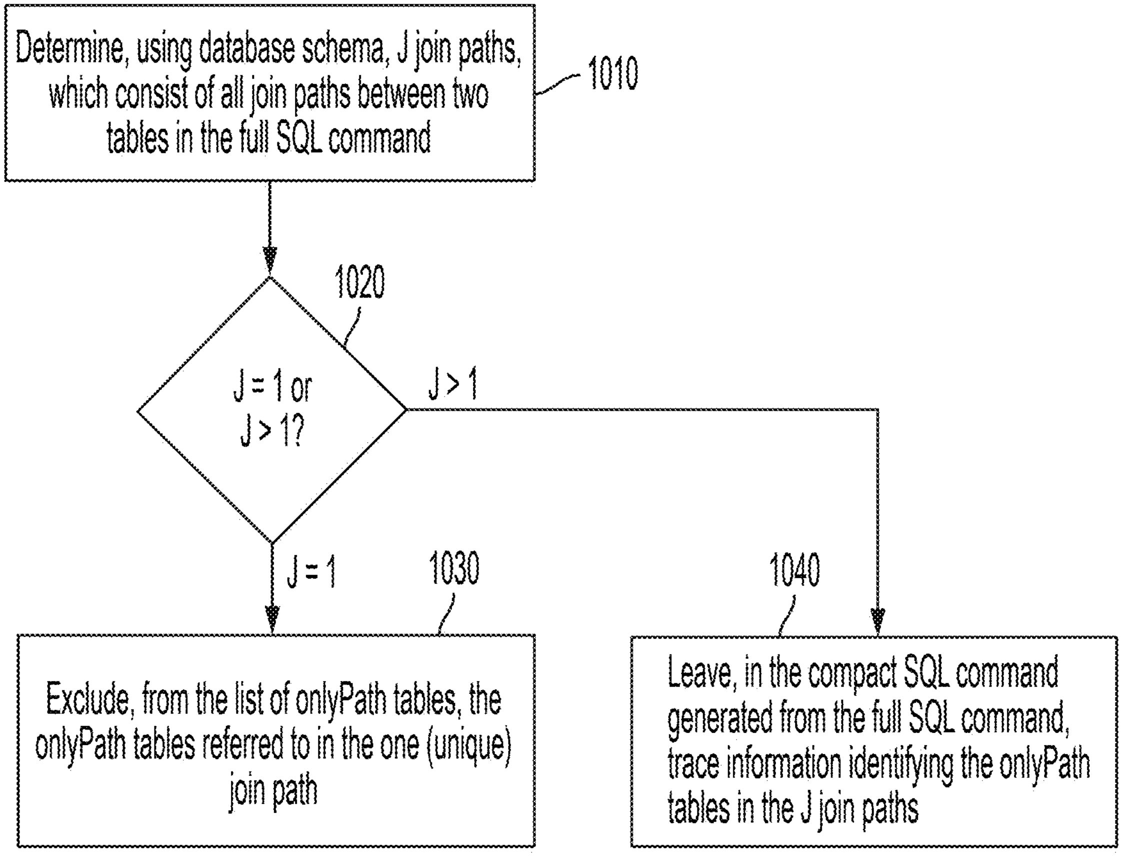
FIG. 10 is a flow chart describing a process of ignoring onlyPath tables when a join path is unique, in accordance with embodiments of the present invention.

Step 910 ignores onlyPath tables when a join path is unique as described infra in conjunction with FIG. 10.

Step 920 distributes onlyPath tables in select, having, order, and group by fields.

For distributing onlyPath tables in select, having, order, and group by fields, if the wildcard character "*" is used in the full SQL query (select/having), then the compact SQL query can be conveniently rewritten such that the explicit table referred to points to one of the tables in the unique path between two tables. The algorithm that converts the compacted SQL command to the full SQL command rewrites the wildcard (*) back into the full SQL command.

For example, if the full SQL command is "select count (*) from T1 join T2 where T1.age>25", then the compact SQL command is "select count (T2) where T1.age>25".

The wildcard can be always inserted in the select field in both the full SQL command and the compact SQL command. For example, if the full SQL command is "select T1.* from T1 join T2 where T1.age>25", then the compact SQL command is "select T2 T1.* where T1.age>25", wherein T2 is trace information in the compact SQL command. The position of the trace T2 in the compact SQL command may be varied (e.g., "select T1.*T2 where T1.age>25" is an acceptable variation.

Step 930 uses onlyPath tables as a field in the compact SQL command,

For use of onlyPath tables as a field in the compact SQL command, only the join instruction is removed, keeping the name of the tables in the unique path between two tables.

For example, if the full SQL command is "select . . . from T1 join T2 join T3 where . . . ", then the compact SQL command is "select . . . from T1T2T3 where . . . ".

Step 940 uses pseudo words for tables that express the onlyPath tables.

For using pseudo words for tables that express the onlyPath tables, the name of the table is replaced by a name that is the composition of the two tables.

For example, if the full SQL command is "select . . . from T1 join T2 where . . . ", then the compact SQL command is "select . . . from T1_T2 where . . . ".

FIG. 10 is a flow chart describing a process of ignoring onlyPath tables when a join path is unique, in accordance with embodiments of the present invention. The process of FIG. 10, which includes steps 1010-1040, implements step 910 of FIG. 9.

Step 1010 determines, using the database schema, J join paths, which consist of all join paths between two tables in the full SQL command, wherein either J=1 or J>1.

Step 1020 determines whether J=1 or J>1. If step 1020 determines that J=1 then step 830 is next executed. If step 1020 determines that J>1 then step 1040 is next executed.

Step 1030 excludes, from the list of onlyPath tables, the onlyPath tables referred to in the one (unique) join path. An example is the tables in the database having just one column on which the join is carried out (i.e., the foreign key is unique) where the one column is unique to any combinations of two tables. If the columns in different tables have the same name, then the names are replaced by substitute column names in the compact SQL command.

Step 1040 leaves, in the compact SQL command generated from the full SQL command, trace information identifying the onlyPath tables in the J join paths. Examples of such trace information will be illustrated infra.

Figure 11:
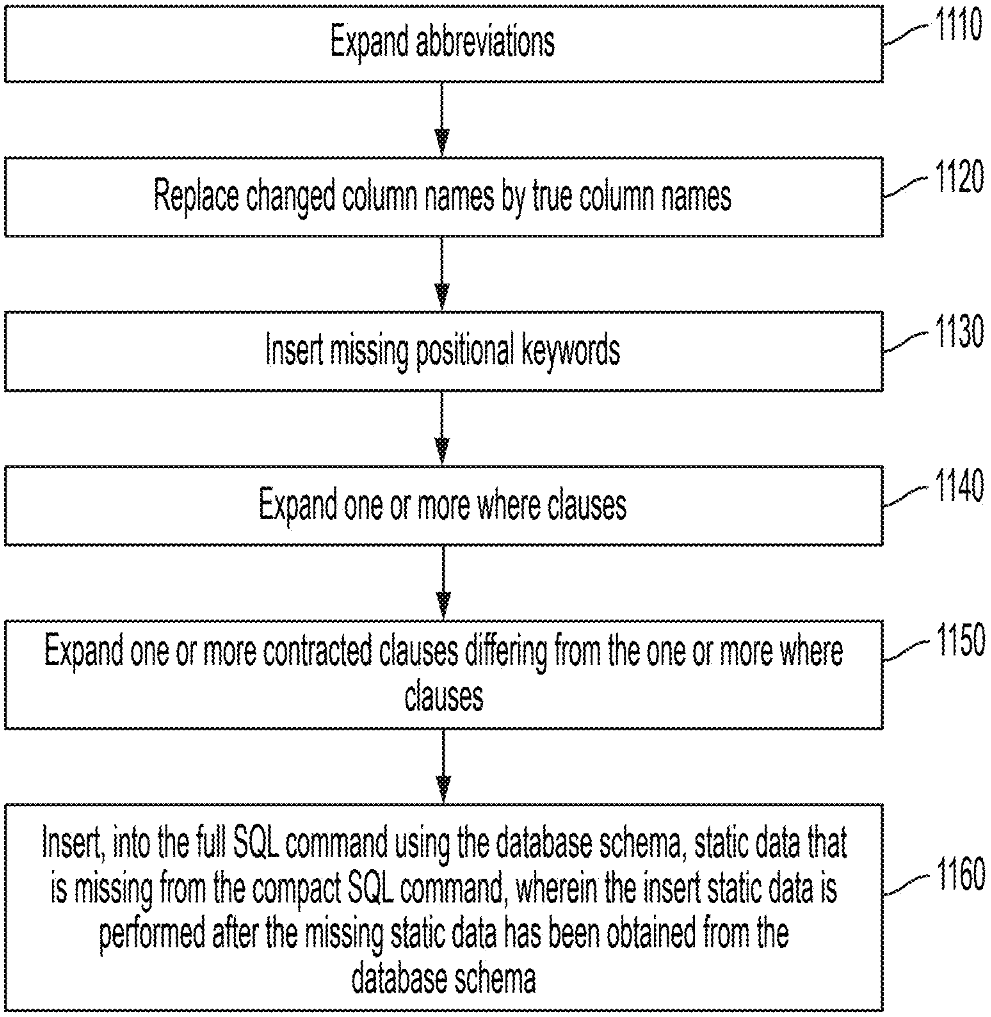
FIG. 11 is a flow chart describing a process for converting a compact SQL command to a full SQL command, in accordance with embodiments of the present invention.

FIG. 11 is a flow chart describing a process for converting a compact SQL command to a full SQL command, in accordance with embodiments of the present invention. The process of FIG. 11 includes steps 1110-1160. Some or all of steps 1110-1160 may be performed.

Step 1110 expand abbreviations, by replacing each abbreviation by the SQL language entity that the abbreviation has replaced. For example, replace S by select, replace C by count, replace D by Distinct, replace H by Having, replace L by Limit, replace A by Avg.

Step 1120 replace changed column names by true column names.

Step 1130 inserts missing positional keywords.

Step 1140 expands one or more where clauses.

Step 1150 expands one or more contracted clauses differing from the one or more where clauses.

Step 1160 inserts, into the full SQL command using the database schema (e.g., details of joins), static data that is missing from the compact SQL command. Step 1160 is performed after the missing static data has been obtained from the database schema.

Advantages of embodiments of the present invention for generating and using the compact SQL command include: (i) the embodiments can be combined in parallel and/or sequentially; (ii) the transformations (i.e., full SQL command to↔compact SQL command) are deterministically reversible; (iii) the compact SQL command is unambiguous (iv) the running time is decreased by a factor of ¼ to 3; and (v) the accuracy of use of the compact SQL command is between −3% and +13% relative to not using the compact SQL command.

Figure 12:
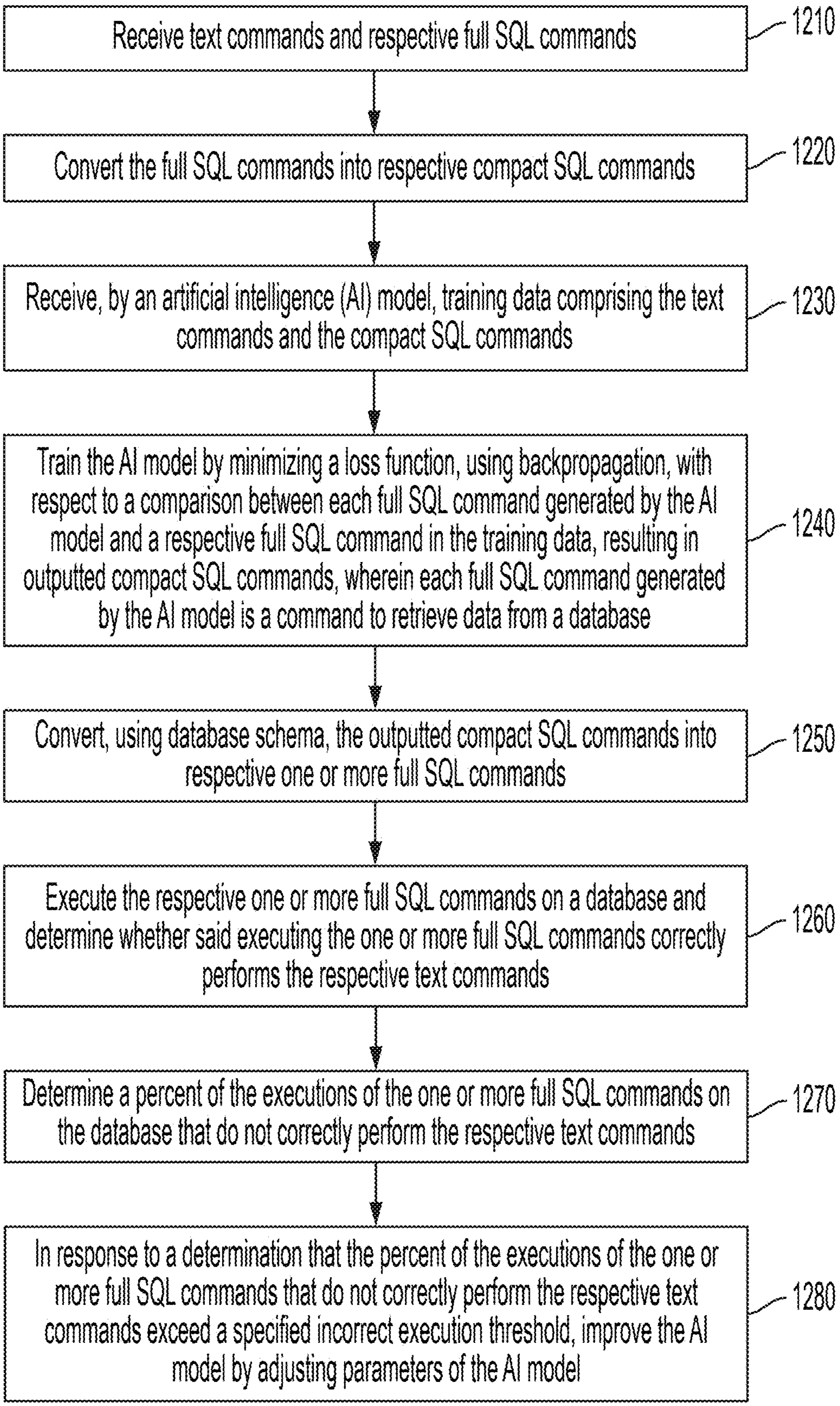
FIG. 12 is a flow chart describing a method for training and testing an AI model in conjunction with compact Structured Query Language (SQL), in accordance with embodiments of the present invention.

FIG. 12 is a flow chart describing a method for training and testing an AI model in conjunction with compact Structured Query Language (SQL), in accordance with embodiments of the present invention. The method of FIG. 13 includes steps 1310-1380.

Step 1210 receive text commands and respective full SQL commands.

Step 1220 convert the full SQL commands into respective compact SQL commands.

Step 1230 receives, by an artificial intelligence (AI) model, training data comprising the text commands and the compact SQL commands.

Step 1240 trains the AI model by minimizing a loss function, using backpropagation, with respect to a comparison between each full SQL command generated by the AI model and a respective full SQL command in the training data, resulting in outputted compact SQL commands, wherein each full SQL command generated by the AI model is a command to retrieve data from a database.

Step 1250 converts, using database schema, the outputted compact SQL commands into respective one or more full SQL commands.

Step 1260 executes the respective one or more full SQL commands on a database and determines whether said executing the one or more full SQL commands correctly performs the respective text commands.

Step 1270 determines a percent of the executions of the one or more full SQL commands on the database that do not correctly perform the respective text commands.

Step 1280 improves the AI model by adjusting parameters of the AI model, in response to a determination that the percent of the executions of the one or more full SQL commands that do not correctly perform the respective text commands exceed a specified incorrect execution threshold.

Figure 13:
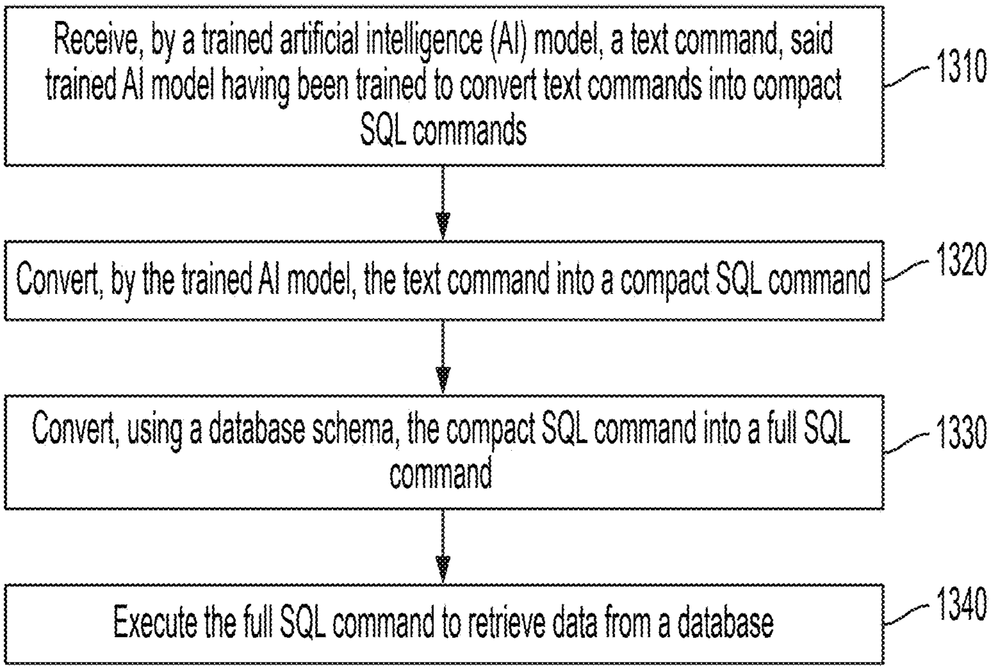
FIG. 13 is a flow chart describing a method for using a trained AI model in conjunction with compact Structured Query Language (SQL), in accordance with embodiments of the present invention.

FIG. 13 is a flow chart describing a method for using a trained AI model in conjunction with compact Structured Query Language (SQL), in accordance with embodiments of the present invention. The method of FIG. 13 includes steps 1310-1340.

Step 1310 receives, by a trained artificial intelligence (AI) model, a text command, said trained AI model having been trained to convert text commands into compact SQL. commands.

Step 1320 converts, by the trained AI model, the text command into a compact SQL command.

Step 1330 converts, using a database schema, the compact SQL command into a full SQL command.

Step 1340 executes the full SQL command to retrieve data from a database.

Figure 14:
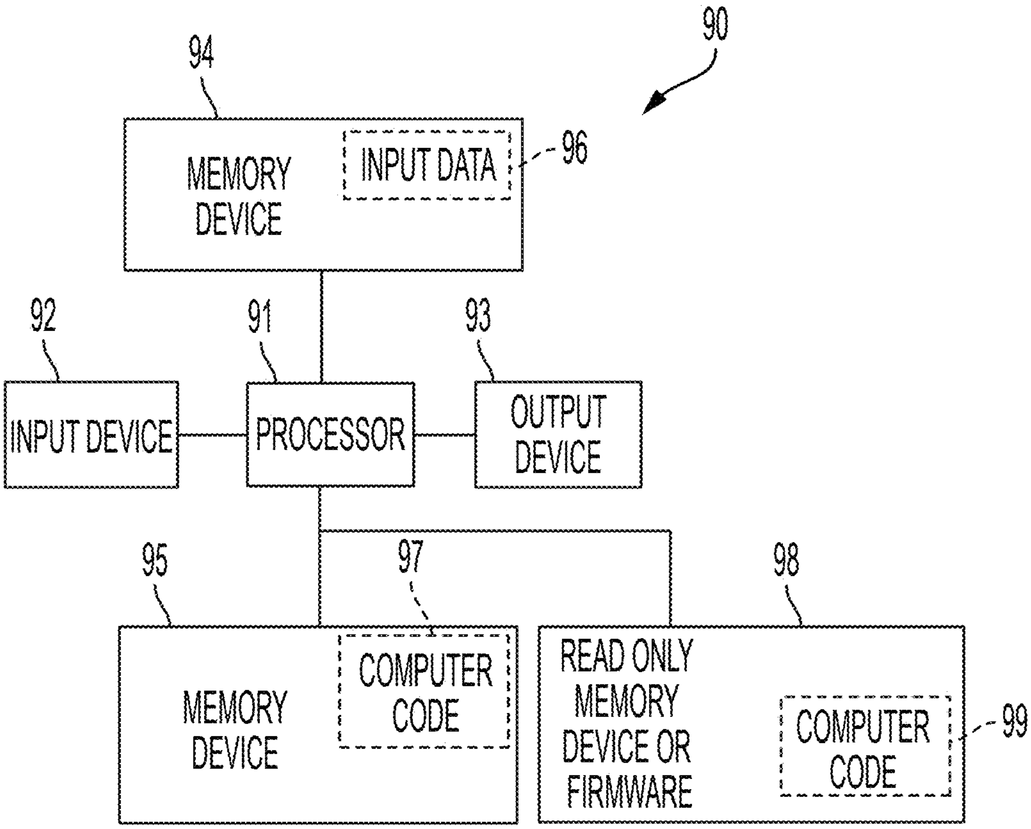
FIG. 14 illustrates a computer system, in accordance with embodiments of the present invention.

FIG. 14 illustrates a computer system 90, in accordance with embodiments of the present invention.

The computer system 90 includes a processor 91, an input device 92 coupled to the processor 91, an output device 93 coupled to the processor 91, and memory devices 94 and 95 each coupled to the processor 91. The processor 91 represents one or more processors and may denote a single processor or a plurality of processors. The input device 92 may be, inter alia, a keyboard, a mouse, a camera, a touchscreen, etc., or a combination thereof. The output device 93 may be, inter alia, a printer, a plotter, a computer screen, a magnetic tape, a removable hard disk, a floppy disk, etc., or a combination thereof. The memory devices 94 and 95 may each be, inter alia, a hard disk, a floppy disk, a magnetic tape, an optical storage such as a compact disc (CD) or a digital video disc (DVD), a dynamic random access memory (DRAM), a read-only memory (ROM), etc., or a combination thereof. The memory device 95 includes a computer code 97. The computer code 97 includes algorithms for executing embodiments of the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as read only memory device 96) may include algorithms and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 99 (e.g., including algorithms) may be stored on a static, nonremovable, read-only storage medium such as a Read-Only Memory (ROM) device 98, or may be accessed by processor 91 directly from such a static, nonremovable, read-only medium 98. Similarly, in some embodiments, stored computer program code 99 may be stored as computer-readable firmware, or may be accessed by processor 91 directly from such firmware, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve software technology associated with cross-referencing metrics associated with plug-in components, generating software code modules, and enabling operational functionality of target cloud components. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving software technology associated with cross-referencing metrics associated with plug-in components, generating software code modules, and enabling operational functionality of target cloud components. In another embodiment, the invention provides a business method that performs the process steps of the invention on a subscription, advertising, and/or fee basis. That is, a service supplier, such as a Solution Integrator, could offer to enable a process for improving software technology associated with cross-referencing metrics associated with plug-in components, generating software code modules, and enabling operational functionality of target cloud components. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 14 shows the computer system 90 as a particular configuration of hardware and software, any configuration of hardware and software, as would be known to a person of ordinary skill in the art, may be utilized for the purposes stated supra in conjunction with the particular computer system 90 of FIG. 14. For example, the memory devices 94 and 95 may be portions of a single memory device rather than separate memory devices.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, said method comprising:

receiving, by one or more processors, text commands and respective full Structured Query Language (SQL) commands;

converting, by the one or more processors, the full SQL commands into respective compact SQL commands;

managing, by the one or more processors, ambiguities in a compact SQL command of the respective compact SQL commands, wherein the managing ambiguities comprises:

ignoring onlyPath tables when a join path is unique, distributing the onlyPath tables in select, having, order, and group by fields, using the onlyPath tables as a field in the compact SQL command, and using pseudo words for tables that express the onlyPath tables;

receiving, by an artificial intelligence (AI) model using the one or more processors, training data comprising the text commands and the compact SQL commands; and training, by the one or more processors, the AI model by minimizing a loss function, using backpropagation, with respect to a comparison between each full SQL command generated by the AI model and a respective full SQL command in the training data, resulting in outputted compact SQL commands, wherein each full SQL command generated by the AI model is a command to retrieve data from a database.

2. The method of claim 1, further comprising:

omitting one or more joins in the compact SQL command;

compacting keywords in the compact SQL command using abbreviations;

omitting one or more clauses and positional keywords in the compact SQL command;

changing names of columns; and rewriting names of tables using aliases.

3. The method of claim 1, further comprising:

determining, by the one or more processors, one or more onlyPath tables in a full SQL command of the received full SQL commands.

4. The method of claim 3, wherein determining the one or more onlyPath tables comprises:

parsing the full SQL command to extract subqueries, aliases, and clauses from the full SQL command;

generating a full table column SQL based on the subqueries, aliases, and clauses; and using, for each subquery, the full table column SQL to determine the onlyPath tables.

5. The method of claim 3, wherein determining the one or more onlyPath tables comprises:

parsing the full SQL command to extract clauses from the full SQL command;

identifying tables within a scope of each join clause in the full SQL command; and determining for each identified table, whether each identified table is an onlyPath table, by determining whether each identified table is referred to in a clause outside the scope of each join clause in the full SQL command.

6. The method of claim 1, wherein ignoring onlyPath tables when a join path is unique comprises:

determining, using database schema, J join paths, which consist of all join paths between two tables in the full SQL command;

determining whether J=1 or J>1;

in response to determining that J=1 so that the J join paths consist of one join path, excluding, from a list of onlyPath tables, the onlyPath tables referred to in the one join path; and in response to determining that J>1, leaving, in the compact SQL command generated from the full SQL command, trace information identifying the one or more onlyPath tables in the J join paths.

7. The method of claim 1, further comprising, after the training:

converting, by the one or more processors using database schema, the outputted compact SQL commands into respective one or more full SQL commands;

executing, by the one or more processors, the respective one or more full SQL commands on a database and determining, by the one or more processors, whether said executing the respective one or more full SQL commands correctly performs respective text commands;

determining, by the one or more processors, a percent of the executions of the one or more full SQL commands on the database that do not correctly perform the respective text commands; and in response to a determination, by the one or more processors, that the percent of the executions of the one or more full SQL commands that do not correctly perform the respective text commands exceed a specified incorrect execution threshold, improving, by the one or more processors, the AI model by adjusting parameters of the AI model.

8. The method of claim 7, wherein converting a compact SQL command of the outputted compact SQL commands into the respective full SQL command comprises:

obtaining, from database schema, static data that is missing from the respective compact SQL commands; and inserting, into each full SQL command of the one or more full SQL commands, the obtained static data that is missing from the respective compact SQL commands.

9. The method of claim 7, wherein converting the compact SQL command of the outputted compact SQL commands into the respective full SQL command further comprises:

performing a plurality of operations selected from a group consisting of expanding abbreviations, replacing changed column names by true column names, inserting missing positional keywords, expanding one or more where clauses, and expanding one or more contracted clauses differing from one or more where clauses.

10. A non-transitory computer-readable medium storing a set of instructions for wireless communication, the set of instructions comprising:

one or more instructions that, when executed by one or more processors of a device, cause the device to:

receive text commands and respective full Structured Query Language (SQL) commands;

convert the full SQL commands into respective compact SQL commands;

manage ambiguities in a compact SQL command of the respective compact SQL commands, wherein the managing ambiguities comprises:

ignoring onlyPath tables when a join path is unique, distributing the onlyPath tables in select, having, order, and group by fields, using the onlyPath tables as a field in the compact SQL command, and using pseudo words for tables that express the onlyPath tables;

receive, by an artificial intelligence (AI) model, training data comprising the text commands and the compact SQL commands; and train the AI model by minimizing a loss function, using backpropagation, with respect to a comparison between each full SQL command generated by the AI model and a respective full SQL command in the training data, resulting in outputted compact SQL commands, wherein each full SQL command generated by the AI model is a command to retrieve data from a database.

11. The non-transitory computer-readable medium of claim 10, wherein the one or more instructions cause the device to:

omit one or more joins in the compact SQL command;

compact keywords in the compact SQL command using abbreviations;

omit one or more clauses and positional keywords in the compact SQL command;

change names of columns; and rewrite names of tables using aliases.

12. The non-transitory computer-readable medium of claim 10, the one or more instructions cause the device to:

determine one or more onlyPath tables in a full SQL command of the received full SQL commands.

13. The non-transitory computer-readable medium of claim 10, the one or more instructions, after the training, cause the device to: convert, using database schema, the outputted compact SQL commands into respective one or more full SQL commands;

execute the respective one or more full SQL commands on a database and determine, by the one or more processors, whether said executing execution of the respective one or more full SQL commands correctly performs respective text commands;

determine a percent of the executions of the one or more full SQL commands on the database that do not correctly perform the respective text commands; and in response to a determination that the percent of the executions of the one or more full SQL commands that do not correctly perform the respective text commands exceed a specified incorrect execution threshold, improve the AI model by adjusting parameters of the AI model.

14. The non-transitory computer-readable medium of claim 13, wherein the one or more instructions, to cause the device to convert a compact SQL command of the outputted compact SQL commands into the respective full SQL command, cause the device to:

obtain, from database schema, static data that is missing from the respective compact SQL commands; and insert, into each full SQL command of the one or more full SQL commands, the obtained static data that is missing from the respective compact SQL commands.

15. The non-transitory computer-readable medium of claim 13, wherein the one or more instructions, to cause the device to convert the compact SQL command of the outputted compact SQL commands into the respective full SQL command, cause the device to:

perform a plurality of operations selected from a group consisting of expanding abbreviations, replacing changed column names by true column names, inserting missing positional keywords, expanding one or more where clauses, and expanding one or more contracted clauses differing from one or more where clauses.

16. A apparatus comprising:

one or more memories; and one or more processors, coupled to the one or more memories, configured to cause the apparatus to:

receive, by one or more processors, text commands and respective full Structured Query Language (SQL) commands;

convert the full SQL commands into respective compact SQL commands;

manage ambiguities in a compact SQL command of the respective compact SQL commands, wherein the managing ambiguities comprises:

ignoring onlyPath tables when a join path is unique, distributing the onlyPath tables in select, having, order, and group by fields, using the onlyPath tables as a field in the compact SQL command, and using pseudo words for tables that express the onlyPath tables;

receive, using an artificial intelligence (AI) model, training data comprising the text commands and the compact SQL commands; and train the AI model by minimizing a loss function, using backpropagation, with respect to a comparison between each full SQL command generated by the AI model and a respective full SQL command in the training data, resulting in outputted compact SQL commands, wherein each full SQL command generated by the AI model is a command to retrieve data from a database.

17. The apparatus of claim 16, wherein the one or more processors are configured to cause the apparatus to:

omit one or more joins in the compact SQL command;

compact keywords in the compact SQL command using abbreviations;

omit one or more clauses and positional keywords in the compact SQL command;

change names of columns; and rewrite names of tables using aliases.

18. The apparatus of claim 16, wherein the one or more processors are further configured to cause the apparatus to:

determine one or more onlyPath tables in a full SQL command of the received full SQL commands.

19. The apparatus of claim 18, wherein the one or more processors, to cause the apparatus to determine the one or more onlyPath tables, are configured to cause the apparatus to:

parse the full SQL command to extract subqueries, aliases, and clauses from the full SQL command;

generate a full table column SQL based on the subqueries, aliases, and clauses; and use, for each subquery, the full table column SQL to determine the onlyPath tables.

20. The apparatus of claim 18, wherein the one or more processors, to cause the apparatus to determine the one or more onlyPath tables, are configured to cause the apparatus to:

parse the full SQL command to extract clauses from the full SQL command;

identify tables within a scope of each join clause in the full SQL command; and determine for each identified table, whether each identified table is an onlyPath table, based on whether each identified table is referred to in a clause outside the scope of each join clause in the full SQL command.

* * * * *